United States Patent Office 2,862,742
Patented Dec. 2, 1958

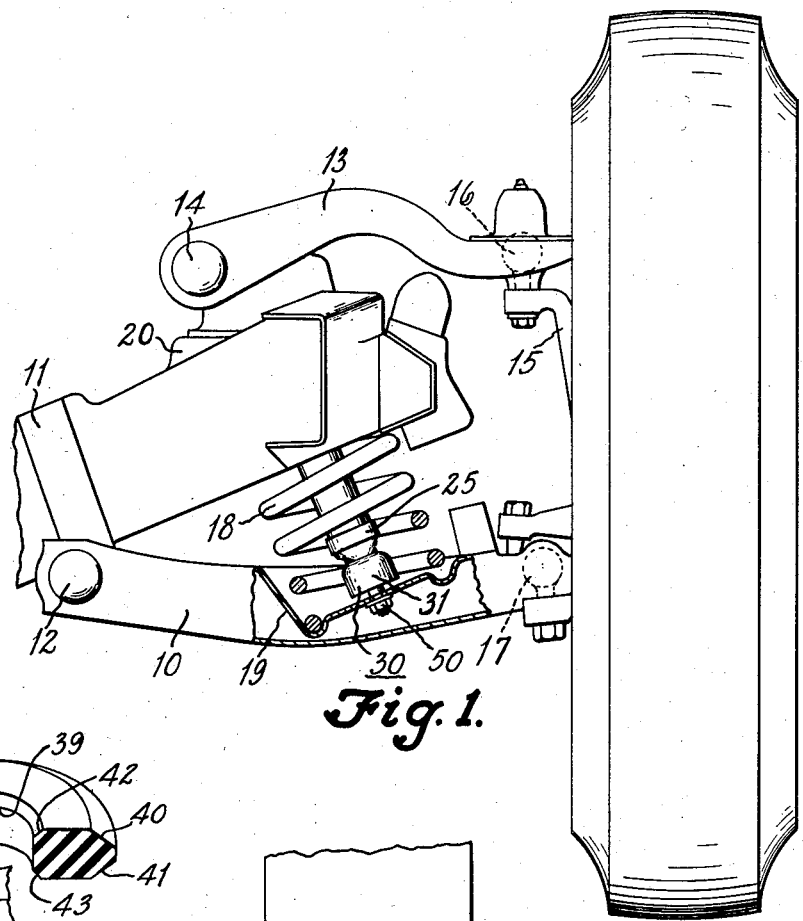

2,862,742

SHOCK ABSORBER MOUNTING

Paul J. Long, Jr., and William F. Schmitz, Dayton, Ohio, assignors to General Motors Corporation, Detroit, Mich., a corporation of Delaware Application October 19, 1956, Serial No. 617,044

3 Claims. (Cl. 287—85)

This invention relates to a mounting for a shock absorber.

An object of the invention is to provide an improved shock absorber mounting wherein the mounting member comprises a stud that can be placed through a drilled hole and the stud is carried on the shock absorber in a manner to allow for both axial movement of the stud in the mounting and angular movement in the mounting.

Further objects and advantages of the present invention will be apparent from the following description, reference being had to the accompanying drawings wherein a preferred form of the invention is clearly shown.

In the drawings,

Figure 1 is an elevational view, partially in cross section, illustrating a shock absorber mounting incorporating features of this invention.

Figure 2 is a cross sectional view of the shock absorber mounting of this invention.

Figure 3 is a perspective elevational view of one of the rubber rings of the shock absorber mounting.

Figure 4 is a perspective elevational view of the mounting stud.

In this invention the shock absorber mounting is adapted to be used in a more or less conventional suspension system such as that illustrated in Figure 1 which represents a front end suspension for a vehicle. The suspension includes a lower control arm 10 supported on the cross member 11 of the chassis frame by means of a pivot connection 12 and an upper control arm 13 similarly supported on the member 11 by a pivot connection 14. The outer ends of the control arms 10 and 13 connect to the steering knuckle 15 by means of spherical joints 16 and 17.

A coil spring 18 is positioned between a spring seat 19 carried on the lower control arm 10 and a spring seat 20 in the cross frame member 11. A shock absorber 25 is connected at its lower end by means of the mounting 30 with the spring seat 19, and is similarly connected at its upper end with the spring seat 20.

The shock absorber mounting 30 consists of a substantially cup shaped cylindrical shell 31 that is attached to the end of a mounting member 32 that extends from the shock absorber 25, the shell 31 being welded to the mounting member 32 by the weld joint 33. A closure disk 34 is secured in the open end of the cup shaped shell 31 by having the end 35 of the shell spun over the edge of the closure member 34. The closure member 34 is provided with a central opening 36 that is on the axis of the mounting member 32.

A pair of rubber-like disks 37 and 38 are placed within the shell 31. Each of the disks are of identical structure and are more particularly illustrated in Fig. 3 wherein the disk 37 comprises a ring-like member having a central opening 39. The outer edge peripheries of the disk 37 have the angular chamfers 40 and 41 and the inner periphery of the opening 39 has the chamfers 42 and 43.

When the ring members 37 and 38 are placed within the shell 31, the dimensions of the ring members are such that the body of the members are uncompressed, that is they are in a free state. The diameter of the openings 39 in the ring members is the same as the cylindrical shank 44 of a stud 45 that has an enlarged head 46 which is placed between the rubber rings 37 and 38 as illustrated in Figure 2.

The enlarged head 46 of the stud 45 has the frusto conical faces 47 and 48 that engage the rubber rings 37 and 38. The portion of the head 46 that is confined between the rubber-like rings 37 and 38 displaces a corresponding and equal volume of the body of the rubber-like rings so that the rings substantially fill the shell 31, as illustrated in Figure 2. Any volume in excess of that required to fill the corners of the shell created by the chamfers 40 and 41 on the rings is displaced into the area of the opening 39 in the rubber ring 37 so that the compression of the body of rubber on both sides of the head 46 is just sufficient to maintain the rubber-like rings 37 and 38 in constant engagement with the stud head 46 during periods of axial movement of the stud or of angular movement of the stud relative to the axis of the shell 31, and is insufficient to place a high torque on the weld joint 33 which would tend to fatigue the weld.

The opening 36 in the closure member 34 has sufficient clearance around the stud shank 44 to allow for angular deflection of the stud relative to the axis of the shell 31. The outer end of the stud 45 has a threaded portion 49 adapted to receive a nut 50 for securing the stud to the spring seat 19, or other similar mounting member.

When the shock absorber 25 is actuated by operation of the suspension with which it is connected, the stud 45 is caused to deflect angularly relative to the axis of the shell 31 because of the angle to which the shock absorber is mounted within the suspension. It is desirable that the deflection be absorbed by the rubber rings 37 and 38 to relieve the torque on the weld joint 33. Thus the degree of compression of the rings 37 and 38 shall be just sufficient to maintain the rings in engagement with the stud head 46 to prevent thumping of the movement of the head during axial movement of the stud 45 relative to the shell 31 and yet will permit sufficient axial deflection of the stud relative to the shell 31 that the torque forces on the weld joint 33 will be sufficiently relieved that it will not fatigue.

While the form of embodiment of the invention as herein disclosed constitutes a preferred form, it is to be understood that other forms might be adopted as may come within the scope of the claims which follow.

What is claimed is as follows.

1. A shock absorber having a mounting device for attachment of the shock absorber to a support, comprising in combination, a shock absorber body having a mounting member, a generally cylindrical cup-shaped shell having a closed end secured on said mounting member and having the other end open, a closure member secured in the open end of said shell and having a central opening therein, a pair of rubber-like ring members positioned within said shell and sized such that when placed in said shell in a free state the ring members will have full surface engagement with one another and with the end surfaces of the cavity formed by the shell enclosure member and with the inner periphery of the shell, and a stud having a shank portion and an enlarged head portion having opposed frusto-conical surfaces, said stud being positioned in said shell with the head portion disposed between said rubber-like rings and the shank portion passing through one of said rings and projecting through said opening in said closure member to the exterior of the shell for attachment of the device to a mounting member, said head portion being sized with a volume to provide the sole displacement of the body of the rubber-like ring members under a no load condition such that the ring members are under compression just sufficient to maintain constant full surface contact with opposite sides of the head portion during axial movement of the stud within the shell and still provide for angular deflection of the stud relative to the axis of the shell with minimum load of angular deflection on the connection of the said shell with said mounting member.

2. A shock absorber having a mounting device for attachment of the shock absorber to a support, comprising in combination, a shock absorber body having a mounting member, a generally cup-shaped shell and having a closed end secured on said mounting member axially on the axis of said shock absorber body and having the other end open, a closure member secured in the open end of said shell and having a central opening therein, a pair of identical rubber-like ring members each having a central opening of the same size as a shank portion of a stud extruding through one of said members and positioned within said shell and adapted to substantially fill the volume of the shell when in a free state therein except for the volume of the openings in said ring members, a stud having a shank portion and an enlarged head portion having opposed frusto-conical surfaces, said stud being positioned in said shell with the head portion disposed between said ring members with the shank portion passing through the opening in one of the ring members and projecting through said opening in said closure member for attachment of the device to a support, said head portion effecting displacement of the body of the rubber-like ring members only to the extent of the volume of the head portion placed between the ring members and effect thereby fully surface engagement of the ring members with the said stud and the inner surface of the shell.

3. A shock absorber having a mounting device for attachment of the shock absorber to a support, comprising in combination, a shock absorber body having a mounting member, a generally cup-shaped shell having a closed end secured on said mounting member axially on the axis of said shock absorber body and having the other end open, a closure member secured in the open end of said shell and having a central opening therein, a pair of identical rubber-like cylinder ring members each having the outer peripheral corners chamfered and having a central opening of the same size as a shank portion of a stud extending through one of said members and positioned within said shell and adapted to substantially fill the volume of the shell when in a free state therein except for the volume of the openings in said ring members and the cavities formed between the ring members and said shell by the chamfered corners of the ring members, a stud having a shank portion and an enlarged head portion having opposed frusto-conical surfaces, said stud being positioned in said shell with the head portion disposed between said ring members with the shank portion passing through the opening in one of the ring members and projecting through said opening in said closure member for attachment of the device to a support, said head portion effecting displacement of the body of the rubber-like ring members only to the extent of the volume of the head portion placed between the ring members and effect thereby full surface engagement of the ring members with the said stud and the inner surface of the shell.

References Cited in the file of this patent

UNITED STATES PATENTS

| | | |
|---|---|---|
| 1,920,436 | Riker | Aug. 1, 1933 |
| 2,287,608 | French | June 23, 1942 |
| 2,344,896 | Phelps | Mar. 21, 1944 |
| 2,611,625 | Kishline et al. | Sept. 23, 1952 |
| 2,621,919 | Utz | Dec. 16, 1952 |